United States Patent [19]

Aubert et al.

[11] Patent Number: 4,867,874
[45] Date of Patent: Sep. 19, 1989

[54] DEVICE FOR FILTERING WATER FROM AN OVERFLOWING SWIMMING POOL, USING AN ACCUMULATING TANK ACTING AS A GRAVITY FILTER

[76] Inventors: Robert Aubert, 472 avenue de Lattre de Tassigny, 83600 Frejus; Albert Flaquet, Villa Contemporaine Colomars, 06670 Saint Martin Du Var, both of France

[21] Appl. No.: 140,244
[22] Filed: Dec. 31, 1987

[30] Foreign Application Priority Data

Dec. 31, 1986 [FR] France .................. 86 18487

[51] Int. Cl.⁴ .................................................. E04H 3/16
[52] U.S. Cl. .................................. 210/169; 210/274; 210/275; 210/416.2
[58] Field of Search ............. 210/169, 263, 274, 275, 210/288, 416.1, 416.2

[56] References Cited

U.S. PATENT DOCUMENTS

| | | | |
|---|---|---|---|
| 2,973,097 | 2/1961 | Snider | 210/288 |
| 3,011,643 | 12/1961 | McCoy | 210/169 |
| 3,178,024 | 4/1965 | Jacuzzi | 210/169 |
| 3,278,034 | 10/1966 | West | 210/169 |
| 3,381,823 | 5/1988 | Nash | 210/288 |
| 3,554,377 | 1/1971 | Miller | 210/275 |
| 3,625,365 | 12/1971 | Armstrong et al. | 210/288 |
| 3,767,050 | 10/1973 | Reiner | 210/169 |
| 4,105,555 | 8/1978 | Pease | 210/169 |
| 4,627,118 | 12/1986 | Baker | 210/416.2 |

FOREIGN PATENT DOCUMENTS 2531474 2/1984 France .
2576521 8/1986 France .

*Primary Examiner*—Richard V. Fisher
*Assistant Examiner*—Coreen Y. Lee
*Attorney, Agent, or Firm*—Young & Thompson

[57] ABSTRACT

An accumulating tank serving as a filter for an overflowing swimming pool, and more particularly a device for filtering water from an overflowing swimming pool using an accumulating tank acting as a gravity filter. The accumulating tank (1) serves as a prefilter, and a filter for water from the pool; it filters by decantation through a filtering mass (8, 9). It comprises apparatus for cleaning the filtering mass (8, 9) by reversing the direction of water current (F2), so as to cause to overflow the volume of water from the accumulating tank (1) and recover the impurities by overflow of the used water into a gutter (15) and evacuation for emptying by a pipe (24).

6 Claims, 3 Drawing Sheets

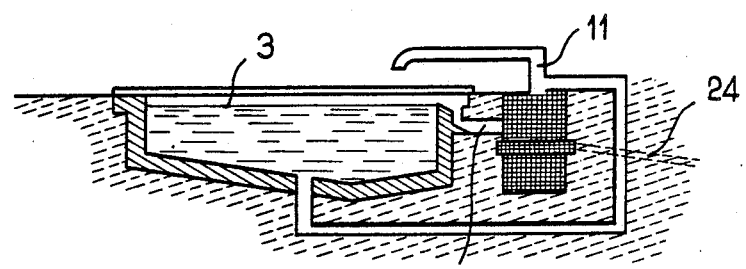
FIG_1
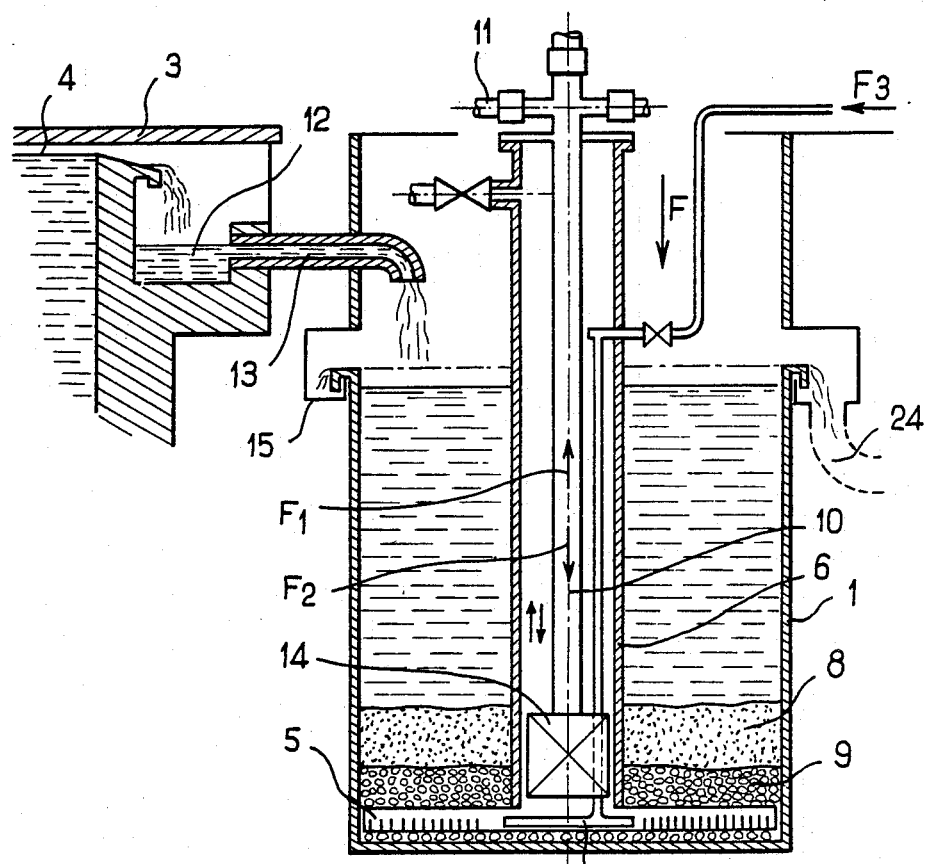
FIG_2

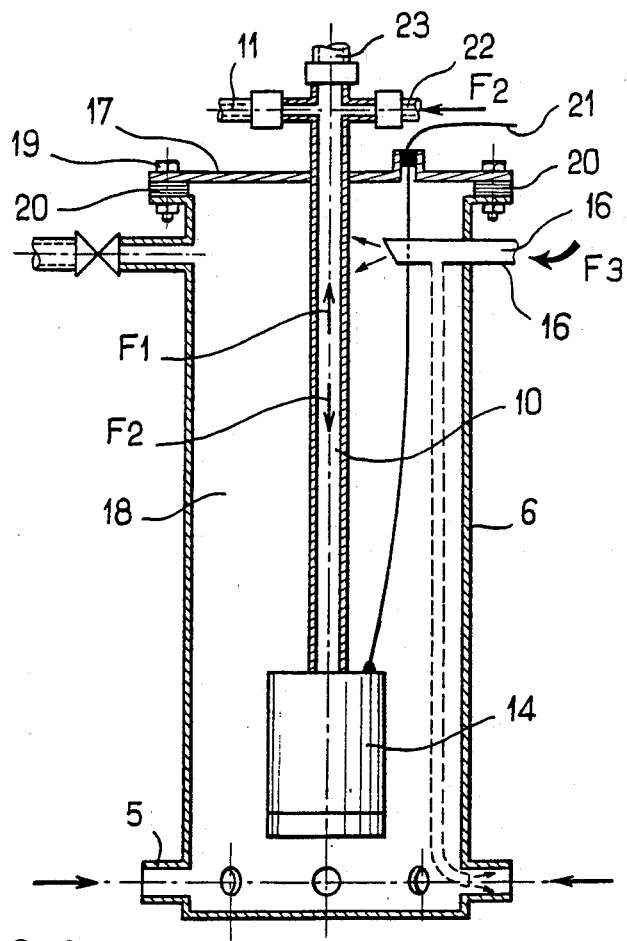
FIG_3
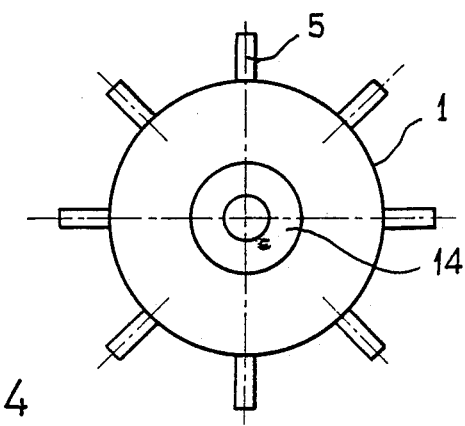
FIG_4

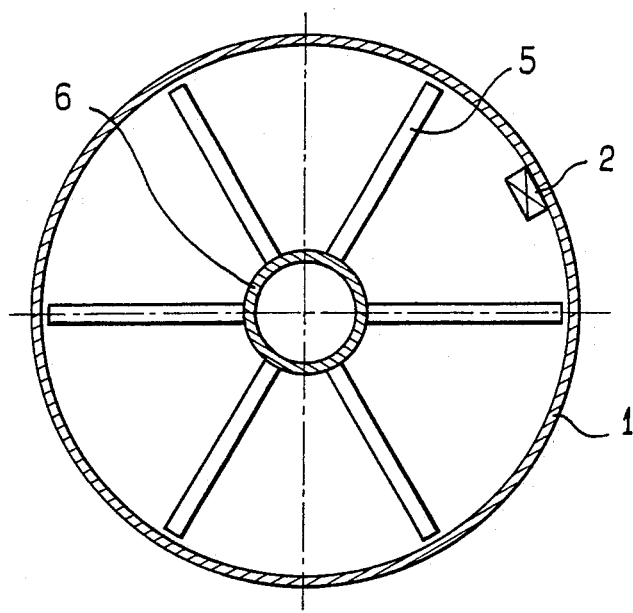
FIG_5
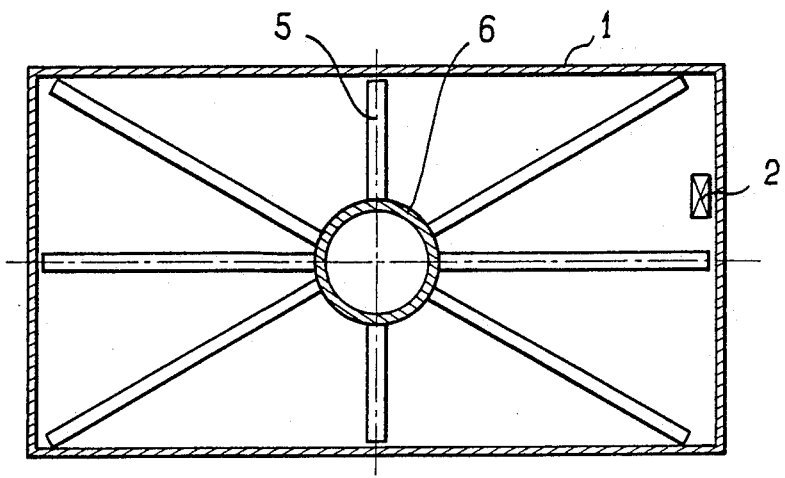
FIG_6

DEVICE FOR FILTERING WATER FROM AN OVERFLOWING SWIMMING POOL, USING AN ACCUMULATING TANK ACTING AS A GRAVITY FILTER

The present invention concerns a device for filtering water from an overflowing swimming pool, using an accumulating tank acting as a gravity filter.

This invention constitutes an improvement of the device described in French patent 2,531,474. That patent describes the manufacture of an overflowing swimming pool, and belongs to the inventors of the present application.

There exist devices for filtering water from a swimming pool, comprising a gravity filter. [French] patent 2,576,521 filed Jan. 30, 1985, describes in essence a device comprising a reservoir enclosing a granular filtering medium, comprising an inlet opening for water to be filtered and an outlet opening for water to be filtered. The filtering medium comprises a layer of sand covered by a layer of a granular filtering medium of lesser density than sand, such as anthracite.

The filtering medium is separated from the inlet opening for water to be filtered, by a filtering partition having openings of a dimension less than the mean diameter of the grains of the filtering medium, this dimension of the openings being greater than that of the impurities retained in the filtering medium.

The principle disadvantage of this device is that the filtering medium is contained in a large circular receptacle that is interposed in the water circuit downstream of the pump.

This independent element may be practically used only in swimming pool installations of very small dimensions, as for swimming pools of greater dimensions it is necessary to use a very low filtration speed or circulation speed, because too rapid a filtration speed gives bad results in that the advancing front of residue that is generated within the filter in question, risks disrupting the mechanism by which the filter settles.

There are thus created preferential channels altogether opposed to satisfactory retention of the smaller particles.

It is accordingly necessary to effect frequent washings of the filter, which increases the cost of maintenance.

In the case of an overflowing swimming pool, it is essential to dispose a prefilter upstream of the pump and a filter downstream of the pump, thereby increasing the number of connections, service areas, etc. At present, the majority of filters operate under pressure, and not by decantation. For the swimming pool of an individual residence, the effective filtering surface may be less than one square meter.

The device according to the invention permits overcoming these disadvantages. Specifically, it comprises a collector at the outlet of the overflowing pool, at the level of the recovery drain, this collector being connected to the accumulating tank which serves simultaneously as a prefilter, filter and service area.

One of the numerous advantages of this invention is that the accumulating tank acting as a filter may be singular, and may be constructed along the same lines as the swimming pool. The surface and volume of this device may thus be perfectly adapted to the pool, or be prefabricated by one or several elements according to the criteria of the pool to be treated.

The accumulating tank acting as filter and prefilter for an overflowing swimming pool, permits filtering of the water by decantation. The surface of the filtered water may, for an individual residential pool, have a filtering surface of 4-6 square meters. It is not necessary to increase the number of connections, and the accumulating tank itself, having a volume of about 6-8 cubic meters, may provide the service area, as well as acting as prefilter and filter. Upkeep of the filter according to the invention is less frequent and very easy, simply by reversing the direction of current and/or compressed air at the level of the filtering mass and the said accumulating tank.

The accumulating tank for overflowing swimming pools is characterized by the fact that it may also serve as a filter.

To this end, the accumulating tank comprises in its lower portion one or several filtering layers in which are disposed at the base of the latter filtering layer one or several strainers connected to an outlet piping which permits return of the filtered water toward the swimming pool. Return of the water after decantation and filtering is effected by a pump.

For cleaning the filtering portion, the filtration circuit may also be connected to a blower that sends air in the direction opposite the preceding, and/or water for delivery to the base of the accumulating tank by means of another pump, or by the same pump that is reversible in its operating direction.

The water at the surface of the said accumulating tank, along with all its impurities, flows into an overflow pipe and is evacuated by a discharge circuit connected to this overflow pipe.

According to a preferred embodiment, the circuits for filtering and for inlet of air and water for cleaning are positioned in a sealed well that contains at least one submerged pump. The lower portion of the sealed well is connected to the strainers.

In the lower portion of the accumulating tank is disposed an array of strainers buried in a filtering tank and connected to the lower portion. The said strainers are connected to a pipe in which is mounted an aspirating and compressing pump. This pump is submerged in a sealed well closed by a cover.

The pump is connected to another pipe, which exits from the sealed well through its cover. This pipe may comprise a connector having several junctions, each provided with a valve or stopcock permitting, respectively, return of filtered water toward the swimming pool, supply of filtered water, for example, to a fountain, and reversal of the direction of current by means of the same pump for reversing the direction of operation or by another pump.

An outlet opening with a stopcock disposed on the upper portion of the well permits emptying the swimming pool.

Finally, it is possible for a pipe to enter into the well, or through the exterior of the well to the strainers. This pipe permits connecting a compressor for discharging compressed air in the strainers.

The pumps are controlled by a remote control system of suitable electrical or the like design. An electronic control unit fixed in the well ensures the functions of filtering water from the swimming pool, cleaning the filtering mass, and especially, maintaining constant the level of the pool, activating the filter depending on the prevailing level in the pool, and commencing filtration depending on how frequently the pool is used.

The accompanying drawings given by way of indicative and non-limiting example will permit a ready comprehension of the invention. They represent a preferred embodiment according to the invention.

FIG. 1 is a schematic view of an accumulating tank for an overflowing swimming pool, which at the same time serves as a filter.

FIG. 2 is a schematic sectional view of the accumulating tank, along with a detail of the swimming pool and its overflow gutter.

FIG. 3 is a sectional view of the well.

FIG. 4 is a view from above of the well of FIG. 3.

FIG. 5 is a plan view of a cylindrical accumulating tank.

FIG. 6 is a plan view of a parallelepipedal accumulating tank.

In FIGS. 1 and 2, the accumulating tank 1 acts simultaneously as a prefilter, filter and service area. An electronic control unit 2 effects various functions, and especially establishing and maintaining a constant level 4 of the pool 3, activation of the filter according to the frequency of use of the pool, commencing filtration according to the wind force, and injecting air by means of an exterior blower, not shown in the figures.

In the lower part of the accumulating tank 1, there is disposed an array of strainers 5 communicating with the base 7 of the well 6 and which serve to return filtered water from the bottom of the accumulating tank 1 to the middle of the filtering mass 8, 9. These strainers 5 are radially disposed, and their length corresponds to the configuration of the accumulating tank 1.

These strainers open into the lower part of the accumulating tank 1.

In a version of the accumulating tank that is not prefabricated (FIG. 6), this latter is custom-built, and harmoniously integrated with the swimming pool 3 with which it may become a fully integrated element.

It is known that a satisfactory purification of water from a swimming pool requires a slow filtration, and a significant and complete number of recyclings of the treated volume of water. An oversized filter is necessary to obtain that result. The accumulating tank 1 permits filtering a large volume of water for a larger and less cumbersome filtering volume than in conventional filters.

This result, namely slow circulation speed and increased number of recyclings, is all the more important as the frequency with which the pool is used increases. So as to obtain a slow passage of water in the sand, it is absolutely necessary to increase the section of the filter, which permits obtaining the present invention that assures a filtration speed with a rate equal from 42 cubic meters/hour/square meter for a conventional filter to 2 cubic meters/hour/square meter for the present accumulating tank. By way of example, an open overflowing swimming pool will be recycled in six hours with a maximum rate of 14 cubic meters/hour, thanks to the said invention.

The strainers 5 are buried in a filtering mass 8, 9. This filtering mass 8, 9 is constituted in its upper part by a layer of silica sand 8 in its purest form, by a multitude of quartz grains, devoid of heterogeneous elements and comprising quartz grains having a dimension of about 0.5 mm and a uniformity coefficient of 80-85%. The quartz layer is of sufficient thickness so that the "leading edge" of the sediment descends with a speed compatible relative to the dimensions of the accumulating tank 1. An underlayer of gravel 9 serving as bottom fill ensures better drainage of the water toward the strainers 5, which underlayer 9 totally covers the said strainers 5.

The network of strainers 5 is connected to the base of the well 6 and also communicates with an interior pipe 10 of the well, which permits return of filtered water in the direction of the arrows F1. This water is piped and discharged through the pipe 11 for refilling the swimming pool 3, while the swimming pool 3 overflows in its overflow gutter 12. The overflow gutter 12 is connected to a pipe 13 that directs overflowing water toward the accumulating tank 1, which automatically adjusts the water level in the swimming pool 3 according to a known technique, by means of the electronic control unit 2.

A pump 14 is submerged in the well 6. This pump 14 permits recovering water, after filtering, through the strainers 5 and evacuation thereof toward the swimming pool via the pipe 11 or via pipe 23 which may, for example, supply a fountain.

To clean the filtering mass 8, 9, it is possible to reverse the direction of water circulation. The pump 14, if it may reverse its direction of operation, or another pump (not shown in the figures), permits returning the water in the direction of the arrows F2. This water arrives via pipe 22, which may be connected, for example, to the swimming pool 3 itself, or to the general water supply. The water arriving in the direction of arrow F2 upsets the filtering material 8, 9 which is agitated, and the surplus water exits via a peripheral overflow gutter 15 that recovers the water and impurities that ascend via agitation toward the surface. This overflow gutter 15 is connected to an evacuation pipe 24 for waste water, which is discarded.

According to another embodiment, the pipe 10 or the sealed well 6 itself may also be connected to an air inlet 16 which is supplied by an air compressor (not shown in the figures). Air is injected in the direction of arrow F3, and that air forms bubbles which permit an agitation of the filtering mass 8, 9, followed by recovery of the impurities contained in the filtering mass 8, 9 which ascend to the surface due to backflow of the water, overflow in the gutter 15 and evacuation for emptying the pipe 24.

The seal between the cover 17 and the body 18 of the well 6 is assured by bolts 19 and toric gaskets 20. The electric wire 21 energizes and control the action of the pump 14.

What is claimed is:

1. Accumulating tank in combination with an overflowing swimming pool, in which said accumulating tank (1) acts as a prefilter and decanting filter for water from the pool, said accumulating tank comprising: mean for filtering pool water by decantation across a filtering mass (8, 9), including a pump (14) submerged in a sealed well (6), said filtering mass comprising an upper layer (8) and lower layer (9), wherein said filtering mass (8, 9) is disposed at the base of said accumulating tank (1); and strainers (5) located at the base of the lowermost filtering layer (9) and connected to an outlet (10) located in said sealed well (6) which permits return of the water filtered by decantation to the swimming pool.

2. Accumulating tank according to claim 1, means for cleaning the filtering mass (8, 9) by reversing the direction of the water current (F2), through the outlet (10), backflow of water through the strainers (5) creating an agitation of the filtering mass (8, 9) causing impurities to ascend to the surface of the level of the accumulating tank where they are recovered by overflow into a gutter (15) and evacuated by an emptying pipe (24) for cleaning of the decantation filter.

3. Accumulating tank according to claim 1, including an electronic control (2) which controls a pump (14) for moving water through the filter and adjusts the height of the water level in the swimming pool as a function of the height of the water level in the accumulating tank (1).

4. Accumulating tank according to claim 1, including a compressed air inlet (16) for creating bubbles and an agitation of the filtering mass (8, 9), so as to clean the filter.

5. Accumulating tank according to claim 1, in which said sealed well (6) is closed by a removable sealing cover (17).

6. Accumulating tank according to claim 1, in which said sealed well (6) is closed by a cover (17); the pump being connected to said outlet (10) which exits from the sealed well (6) via said cover (17) said outlet comprising a connector with several junctions each having a valve permitting return of filtered water toward the swimming pool, alternative supply of filtered water, and reversing of the direction of liquid flow to backwash the filter.

* * * * *